United States Patent [19]

Lobanoff

[11] 4,240,762

[45] Dec. 23, 1980

[54] SEAL-ALIGNING RIGID COUPLING ASSEMBLY

[75] Inventor: Valenteen S. Lobanoff, Seneca Falls, N.Y.

[73] Assignee: Johnston Pump Company, Glendora, Calif.

[21] Appl. No.: 19,482

[22] Filed: Mar. 12, 1979

[51] Int. Cl.³ ............................................. F16D 1/00
[52] U.S. Cl. .................................... 403/24; 403/287; 403/301; 403/337
[58] Field of Search ............... 403/337, 336, 338, 335, 403/287, 301, 302, 312, 24

[56] References Cited

U.S. PATENT DOCUMENTS

| | | | |
|---|---|---|---|
| 155,837 | 10/1874 | Light | 403/312 |
| 2,830,801 | 4/1958 | Stratienko et al. | 403/377 X |
| 2,865,299 | 12/1958 | Hornschuch et al. | 403/337 X |
| 3,468,572 | 9/1969 | Haentjeus | 403/337 |
| 3,560,029 | 2/1971 | Floyd, Jr. | 403/312 X |
| 3,685,367 | 8/1972 | Dawson | 403/312 X |
| 3,838,987 | 10/1974 | Draut | 403/312 X |
| 4,121,532 | 10/1978 | Coryell | 403/337 X |

*Primary Examiner*—Andrew V. Kundrat
*Attorney, Agent, or Firm*—Fischer and Tachner

[57] ABSTRACT

An improved coupling assembly (52) for rigidly securing the shaft (18) of a vertical pump (10) to the co-linearly spaced shaft (24) of a pump driver (22). A novel design provides a reduced uniform maximum diameter and obviates shaft threading and registration fits. The resulting assembly is, therefore, easier and less costly to fabricate accurately wherein pump shaft runout at the stuffing box face is no greater than 0.002 inches T.I.R. The coupling assembly of the present invention comprises a pair of cylindrical rigid hubs (54, 56) which may be secured to the pump and driver shafts (18, 24), respectively, by means of split rings (76, 78, 80, 82) for vertical thrust bearing; and an optional split spacer (64, 66) positioned between the hubs. Split shims (58) are employed above the pump-shaft rigid hub (54) to provide vertical position adjustment of the pump shaft (18) relative to the driver shaft (24).

10 Claims, 7 Drawing Figures

AXIAL THRUST

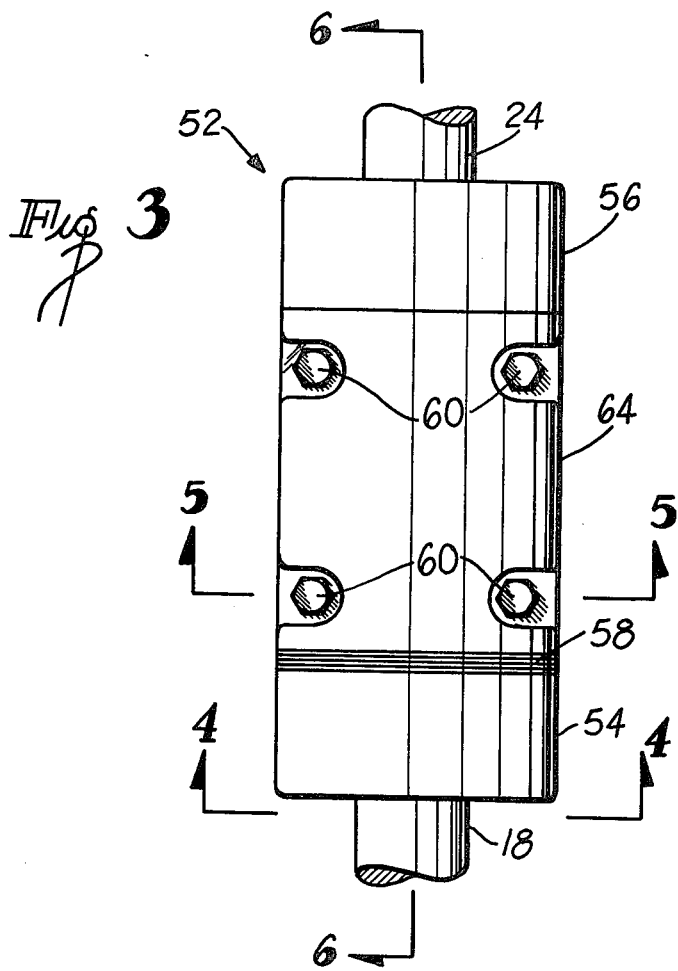
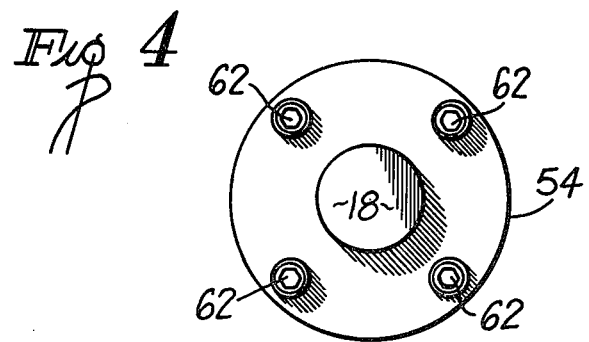

SEAL-ALIGNING RIGID COUPLING ASSEMBLY

TECHNICAL FIELD

This invention relates to a coupling assembly for connecting the shaft of a vertical pump to the shaft of a pump driver. More specifically, the present invention relates to an improved coupling assembly which performs all the functions of conventional coupling assemblies but which can be fabricated at substantially reduced cost and with far greater accuracy to reduce the liklihood of pump shaft unbalance and pump maintenance.

BACKGROUND ART

The advantages of vertical pumps are well known in the art. By way of example, because a predominant portion of the vertical pump is commonly installed below ground level, vertical pumps with capacities between one hundred and fifty thousand gallons per minute, may be conveniently employed between horizontal inlet and outlet pipes spaced only a few feet apart. In addition, if pumping head is to be increased, this may be readily accomplished by simply adding stages to the existing pump without altering the pipe assembly leading to and from the pump. In addition, the driver for a vertical pump, which may be an electric motor, a steam turbine, or gas turbine, is readily accessible for easy maintenance and repair. One possible disadvantge of vertical pumps results from the vertical shaft which does not have vertical thrust bearing capacity. Accordingly, a rigid coupling must be utilized to connect the pump shaft to the driver shaft for both radial and axial thrust load bearing.

Rigid coupling assemblies which are designed to transmit the thrust forces of the pump driver to the pump shaft for rotation thereof, while fully bearing the axial thrust loads of the driver that cannot be borne by the pump, are well known in the art. For example, connection of vertical industrial pumps to appropriate drivers, is normally made by using spacer-type adjustable couplings. This is true for all types of vertical pumps, be they turbine type or volute type; be they single or multistage units; and whether they use open or closed impellers. A spacer-type coupling is normally required to facilitate the removal of the pump stuffing box components comprising primarily mechanical seals. Adjustment of the coupling is often necessary to locate the pump shaft in its proper vertical position for high speed rotation during pump operation. Furthermore, as previously indicated, the coupling has to be designed to carry axial thrusts.

Successful long term and low cost operation of a vertical pump depends to a great extent on very accurate coupling machining as well as good dynamic balance and extreme care in assembly. Typically, inaccurate machining, or dynamic imbalance, or improper assembly, leads to serious wobble or vibration in the rotating pump system. Such wobble and vibration greatly accelerates the wear and tear of the pump and motor and lead to breakdowns that require extremely difficult, costly, and time consuming repair.

Because of the inherently disadvantageous design of prior art coupling assemblies, dynamic unbalance due to shaft runout remains a problem despite the pump industry's attempts to machine prior art couplings with great accuracy and at commensurately high cost. For example, it is generally accepted in the industry that an acceptable level of shaft runout (in total indicator runout, T.I.R) at the stuffing box face is 0.002 inches. However, in order to maintain such a low runout, the accuracy of all machining of assembly fits, bores, faces, and drilling must be held within plus or minus 0.001 inches. Unfortunately in standard commercial machining shops, it is almost impossible to achieve such accuracies with large diameter registration fits and it is generally impossible to maintain 0.002 inches T.I.R. during operation. The best stuffing box face shaft runout currently available is about 0.007 inches. Even such relatively inaccurate machining is still extremely costly to attain because of the inherent design problems associated with prior art coupling assemblies; and, a shaft runout of 0.007 inches is too high to prevent frequent and costly breakdown and maintenance problems in the field.

The present invention overcomes the aforementioned disadvantages of prior art coupling assemblies by providing a unique coupling configuration that, compared to prior art coupling assemblies, is relatively easy to accurately machine, and thus provide extremely low shaft runout. The present invention, like prior art coupling assemblies, provides means for imparting rotational thrust to the pump shaft, affords a rigid coupling device which bears pump axial thrusts while providing for vertical adjustment of the pump shaft, and still facilitates easy removal of the pump stuffing box components. However, the present invention facilitates highly accurate machining at relatively low cost. Thus, the present invention substantially decreases the liklihood of dynamic unbalance induced by prior art couplings and substantially avoids frequent and costly down-time maintenance problems, as well as pump and driver wear.

The applicant has solved the problems of the prior art coupling assemblies by means of a self-aligning rigid coupling assembly which, unlike the prior art coupling assemblies, does not require accurate registration fits, and does not depend on threading of the shaft. The invention employs small diameter sections that may be accurately machined so that the dynamic unbalance of the prior art is extremely unlikely.

The present invention does away with the multiflange, large diameter coupling, and large diameter registration fits that are difficult to accurately machine. The present invention employs a comparatively small, constant diameter coupling which includes a pair of rigid hubs separated by adjustment shims and an optional split spacer. Each such component of the novel coupling of the present invention has a diameter which is equal to or less than the maximum diameter of coupling hubs of the prior art.

It is therefore a primary object of the present invention to provide a rigid coupling assembly to couple the shaft of a vertical pump to the co-linearly spaced shaft of the pump driver, but to do so in a manner which overcomes or substantially reduces the disadvantageous high costs and frequent maintenance problems caused by prior art coupling assemblies.

It is a further object of the present invention to provide a spacer-type, adjustable, rigid-split coupling for vertical pumps, the design of which renders it relatively simple to maintain a maximum, total indicator runout of the rotating pump shaft of 0.002 inches at the stuffing box face.

It is still a further object of the present invention to provide a rigid-split coupling for vertical pumps that eliminates all large diameter fits and shaft threading that is typical in prior art couplings.

It is still a further object of the present invention to provide a new coupling assembly of which all parts can be machined from the same diameter forging or tubing and wherein such diameter is sufficiently small to substantially eliminate the liklihood of dynamic unbalance in the rotating shaft-coupling-shaft combination.

BRIEF DESCRIPTION OF THE DRAWINGS

The above noted objects and advantages will become evident hereinafter as a result of the following description of a preferred embodiment of the invention, described by way of example and illustrated in the accompanying drawings in which:

FIG. 3 is a plan view of a coupling assembly of the present invention shown in a typical configuration for coupling a driver shaft to a vertical pump shaft;

FIG. 4 is a bottom view of the present invention taken along the lines 4—4 of FIG. 3;

DETAILED DESCRIPTION OF A PREFERRED EMBODIMENT

Figures 1, 2:
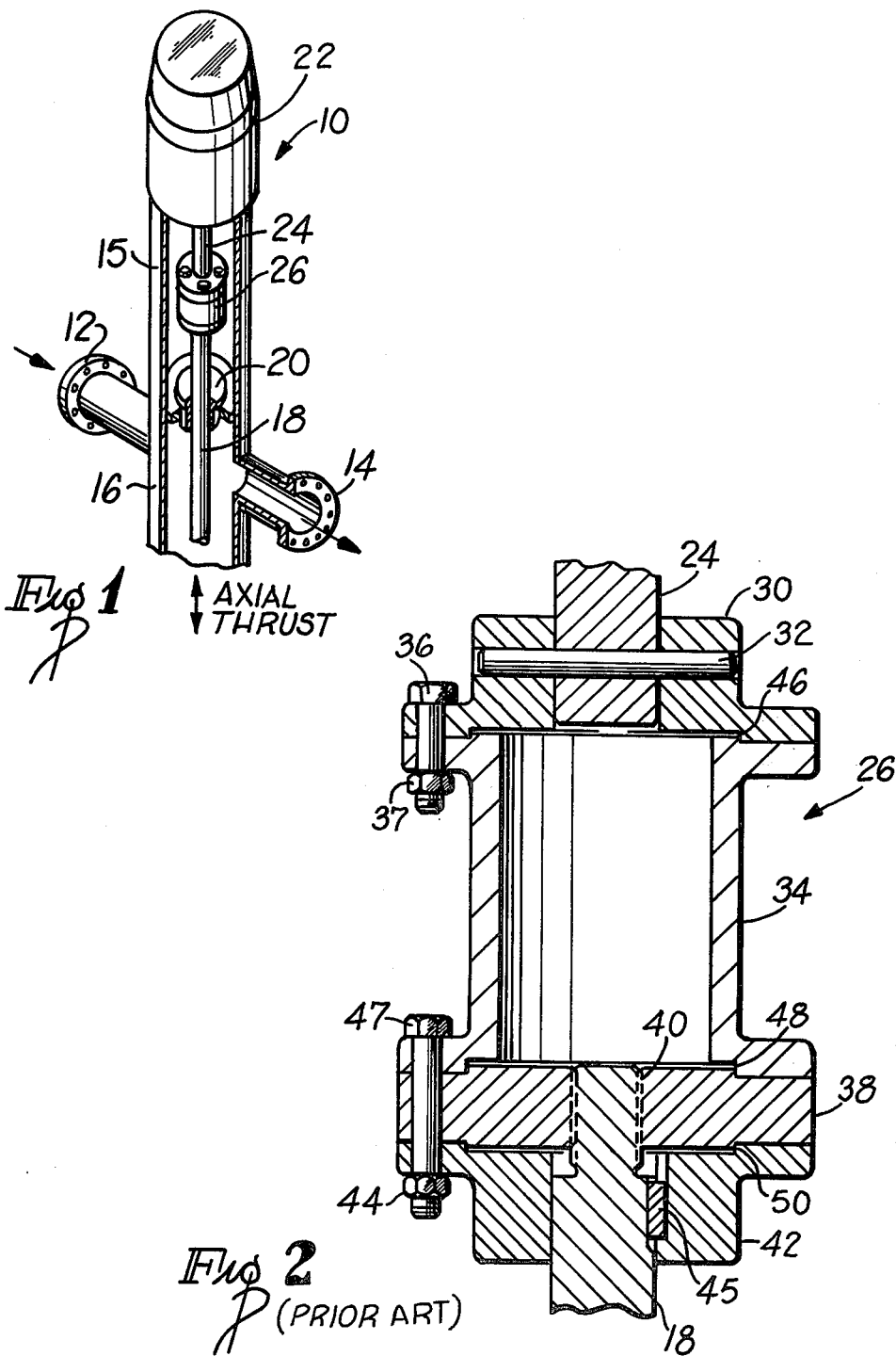
FIG. 1 is a three-dimensional diagram of a vertical pump and motor-driver combination in which coupling assemblies of the type herein described are commonly used.
FIG. 2 is a sectional view of a prior art coupling assembly used to explain the many disadvantages of such assemblies that are overcome in the present invention.

Referring to FIG. 1 there is shown therein that portion of a vertical pump and a suitable driver therefor with which a coupling assembly of the type to which the present invention pertains, would be utilized. The vertical pump 10 includes an inlet pipe 12 through which a liquid flows into the pump and down through one or more stages, (not shown). The pump then propels such liquid by means of such stages, up and out of the pump through outlet pipe 14 and into the plumbing of the system to which the pump is connected. The aforementioned pump stages are contained within a pump barrel 16, which is typically installed below ground level. The pumping operation is enabled by rotation of shaft 18 which at the upper portion thereof exits pump barrel 16 at a stuffing or packing box 20 which provides a seal to the liquid within the pump and which also provides access to the lower stages of the pump. Pump shaft 18 is rotated by a pump driver 22 which is usually an electric motor, although steam and gas turbines may also be used for that purpose.

As shown in FIG. 1, pump driver 22 also provides a shaft, in this case driver shaft 24. Typically, the length of the pump shaft above the stuffing or packing box 20 is about six (6) inches, while the length of the driver shaft that is accessible below the driver is between about three (3) inches and six (6) inches. In addition, there is typically a space or gap between the upper end of pump shaft 18 and the lower end of driver shaft 24 to permit easy access to the top of the pump shaft for vertical adjustment thereof to permit adjustment of the vertical position of the impellers of the pump at an optimum location for efficient pump operation.

In order to transfer the rotational thrust of the driver shaft to the pump shaft for operation of the pump and to also provide axial thrust bearing support for the large axial thrusts that normally occur in operation of a vertical pump, a rigid coupling assembly 26 is provided. Typically, the portion of the pump shaft above the stuffing box, the accessible portion of the driver shaft, and the coupling assembly, are housed in a pump head 15 which has large openings to provide easy access to the two shafts and the coupling assembly. As previously indicated, shaft runout, which is a measure of shaft eccentricity, is a critical parameter in pump operation particularly at the top face of stuffing box 20. If such runout exceeds 0.002 inches, pump shaft wobble and/or vibration results, and usually within a relatively short time, causes pump damage and breakdown which interferes with system operation and results in costly pump and driver repair.

It will be seen hereinafter that the present invention is an improved coupling assembly to be installed in the position occupied by coupling 26 in FIG. 1, but which substantially reduces the liklihood of inimical shaft runout and the resultant detrimental effects of such runout that occur as a result of the deficiencies of prior art coupling assemblies. However, before proceeding with a detailed description of the novel and advantageous coupling assembly of the present invention, a description of a typical prior art coupling assembly will be provided in conjunction with FIG. 2 so that the relative advantages of the present invention as compared to such prior art coupling assemblies may be better understood.

As shown in FIG. 2, prior art coupling 26 rigidly interconnects pump shaft 18 with driver shaft 24. This is accomplished as follows: A driver-half coupling 30 is concentrically connected to driver shaft 24 by means of a shaft pin 32, which is secured through a suitably matched aperture in shaft 24. Driver-half coupling 30 is, in turn, connected to a spacer 34 by means such as bolt 36 and matching nut 37, which, it will be understood, is typical of a plurality of such bolts and matching nuts spaced equidistantly around the matching flanges of driver-half coupling 30 and spacer 34.

At the lower end of prior art coupling 26, the coupling is adjustably secured to pump shaft 18 as follows: An internally threaded adjusting plate 38 is connected to a matching threaded end 40 of pump shaft 18. Clearly, rotation of the coupling assembly, including adjusting plate 38, has the effect of varying the vertical position of pump shaft 18 with respect to the position of driver shaft 24.

Axial thrust is imparted from the coupling assembly 26 to the pump shaft 18 by means of pump-half coupling 42 which is concentrically positioned around pump shaft 18 and interconnected thereto for radial lock by means of key 45 which is secured in suitable grooves in both shaft 18 and half coupling 42 in a manner well known in the art. Half coupling 42 and adjusting plate 38 are secured together and, in turn, are secured to spacer 34, by means of a plurality of bolts and matching nuts through their respective flanges of which bolt 47 and matching nut 44 comprise one tyical example.

As shown further in FIG. 2, prior art coupling 26 includes three large diameter registration fits which are designed to preclude eccentricity of the assembly and the resultant shaft runout as previously discussed. These registration fits include fit 46 at the region of interface between half coupling 30 and spacer 34; fit 48 at the region of interface between spacer 34 and adjusting plate 38; and fit 50 at the region of interface between adjusting plate 38 and half coupling 42. The difficulty of accurately machining such registration fits, particularly in relatively large diameter machined parts, is well known in the art. This difficulty combined with the similar difficulty of accurately machining a threaded fit between the threaded end of pump shaft 18 and the threading adjusting plate 38, are the causes of the problems associated with such prior art coupling assemblies that lead to higher than acceptable shaft runout and the previously discussed inimical effects of such runout.

In addition to the above indicated disadvantages of typical prior art assembly 26, it will now be apparent to those familiar with the art that there are other difficulties and potential disadvantages associated with such prior art assemblies. By way of example, the use of a threaded adjusting plate 38, which requires the threading of the end of the pump shaft 18, is a major source of inconvenience and cost associated with manufacture of the vertical pump. In addition it will be recognized that the relatively large diamter flange members of prior art coupling assemblies such as that illustrated in FIG. 2, are more likely to lead to dynamic unbalance during shaft rotation at high speeds such as 1750 RPM to 5000 RPM, each of which is typical for motor driven vertical pumps in the 150 to 2000 horsepower range.

Referring now to FIG. 3, a coupling assembly 52 of the present invention is shown interconnecting a pump shaft 18 with a driver shaft 24, and is drawn to approximately the same scale as prior art drawing FIG. 2. It will be seen that the maximum diameter of each component of coupling assembly 52 is about equal to the maximum diameter of the remaining components of coupling 52 and furthermore, that each such maximum diameter is no greater than the diameter of the non-flanged portion of the half couplings of the prior art assembly of FIG. 2. Furthermore, it will be observed that there are no flanged portions at all, let alone flanged portions of large diameter corresponding to the flanged portions of the prior art assembly of FIG. 2.

As seen in FIG. 3, the coupling assembly of the present invention comprises three major components, namely, rigid pump hub 54, rigid driver hub 56, and a split spacer comprising two sections of which one section, namely, split spacer section 64 is visible in the view of FIG. 3 and the other of which, namely, split section 66, will be seen hereinafter in conjunction with FIGS. 5 and 6. Unlike the spacers of the prior art, the spacer used in the present invention is split so that it may be readily removed from coupling assembly 52 merely by loosening and removing the four bolts 60, the heads of which are shown in FIG. 3.

It will be seen hereinafter that the vertical adjustment of the position of pump shaft 18 with respect to driver shaft 24 may be accommodated in the present invention by the use of a plurality of shims 58 which, as shown in FIG. 3, are located in the coupling assembly between hub 54 and the spacer. These shims are split so that they also may be more easily installed or removed from the assembly when access to the shafts is desirable or when readjustment of the shafts with respect to one another is being made.

Hubs 54 and 56 are each secured by a plurality of bolts to the intermediately positioned spacer comprising sections 64 and 66. Although many bolts would be suitable for securing the hubs to the spacer, it is desirable to use bolts such as bolt 62 shown in FIG. 4 and in FIG. 6, which is of the Allen wrench type so that the head of the bolt may be positioned within a suitable depression within the outer perimeter of the hubs for safety. Location of the bolt heads within the outer edge of the coupling assembly also enhances the probability of good dynamic balance of the assembly during high speed rotation. Clearly, bolts equivalent to those shown in FIG. 4 would also secure hub 56 on the upper side of the spacer and in fact one such bolt, 70, is shown in FIg. 6 as typical.

Figure 5:
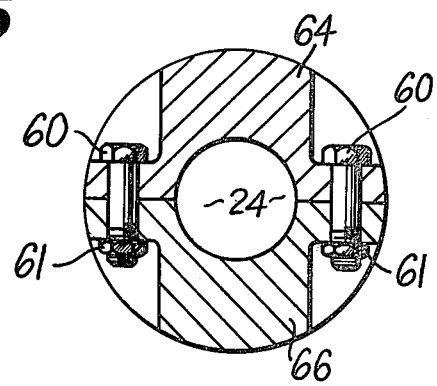
FIG. 5 is a sectional bottom view of the present invention taken along the lines 5—5 of FIG. 3.

Referring now to FIG. 5 which is a cross-sectional view of the coupling assembly of the present invention taken along lines 5—5 of FIG. 3, it will be seen that the cross section of the spacer comprising spacer sections 64 and 66 is essentially circular with a diameter equal to the diameter of hub 56, but with four quadrants or sections machined away to provide suitable surfaces upon which to secure the split spacer sections 64 and 66 to one another by means of bolts 60 and matching nuts 61. It will be observed from the cross-sectional view provided in FIG. 5, that the novel geometrical design of the present invention provides easy access to the means for securing the split spacer sections 64 and 66 to each other, but does so without requiring that any part of the assembly of the invention be located beyond the perimeter of the pump and driver hubs 54 and 56, respectively, or that of the joined spacer sections 64 and 66. This novel feature of the present invention is particularly advantageous in maintaining dynamic balance at high speed rotation as previously discussed.

Figure 6:
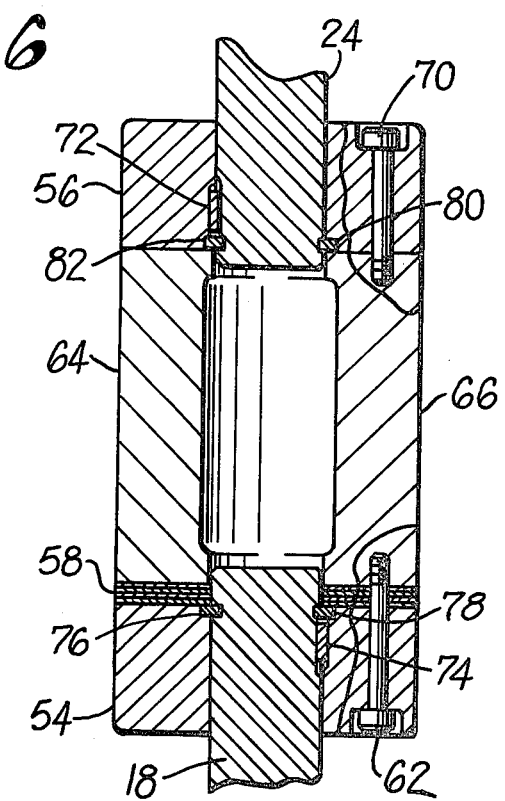
FIG. 6 is a sectional side view of the present invention taken along the lines 6—6 of FIG. 3.

A more detailed indication of the manner in which the coupling assembly of the present invention is secured to the shafts 18 and 24 as a unitary rigid assembly which provides for both radial and axial thrusts, and which also provides means for vertical position adjustment of the pump shaft 18, is shown in FIG. 6. It will be seen in FIG. 6 that the rigid driver hub 56 is secured to driver shaft 24 by means of a split ring having split ring portions 80 and 82 which are positioned in suitably grooved portions of shaft 24 and hub 56. In addition, radial lock between hub 56 and shaft 24 is provided by means of key 72 in a fashion similar to that discussed previously in conjunction with prior art coupler of FIG. 2. As shown further in FIG. 6, hub 56 is also secured by means of bolts 70 to the spacer sections 64 and 66.

At the lower end of assembly 52, as illustrated in FIG. 6, the rigid pump hub 54 is similarly secured to pump shaft 18 for axial thrust bearing by means of split rings sections 76 and 78 positioned in similar grooved portions of the hub and shaft 18, and is secured for radial thrust bearing by means of key 74 in a manner similar to that of hub 56. Hub 54 is also secured to spacer section 64 and 66 by means of a plurality of bolts 62, usually spaced equiangularly around the circumference of the hub. The purpose for and the manner in which split shims 58 are utilized in the coupling assembly of the invention for purposes of providing vertical position adjustment of the pump shaft with respect to the driver shaft, will be readily apparent from the view of the assembly provided in FIG. 6. Clearly, an increase in the number of shims 58 would be appropriate for lowering shaft 18 with respect to shaft 24 or in other words, for an increase in the gap length between the ends of the respective shafts. Similarly, a reduction in the number of shims 58 would raise shaft 18 with respect to shaft 24, or in other words, for a decrease in the gap length between the ends of the respective shafts.

As previously indicated, the spacer of the coupling assembly comprising split sections 64 and 66, is an optional element of the invention and although spacer sections of lengths dependent upon the desired gap length between the two shafts 18 and 24 would most likely be utilized in typical installations involving the present invention, there may be occasions when the shafts 18 and 24 are virtually in contact with each other at their respective ends. On such occasions, a spacer between hubs 56 and 54 would not be utilized. One such configuration of the present invention in which the optional spacer has been omitted, is shown in cross section in FIG. 7. It will be observed that the components utilized to lock the hubs 54 and 56' respectively for both radial and axial thrust bearing are essentially the same as those illustrated in FIG. 6. The principal difference is substitution of a slightly different hub configuration, 56', to provide a suitably threaded series of receiving holes so that the two hubs 54 and 56 may be secured together on either side of shims 58 by means of the single series of bolts 62.

Figure 7:
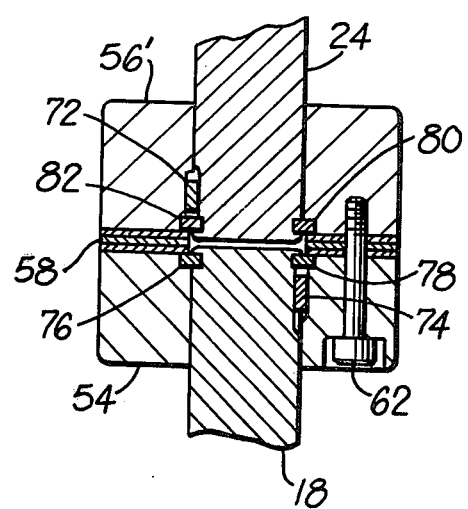
FIG. 7 is a sectional side view of the present invention similar to that shown in FIG. 6, but with the optional spacer portion of the invention omitted.

In either configuration, namely, the more likely common configuration of FIG. 6, which includes the spacer, or the configuration of FIG. 7, in which the optional spacer is omitted, it will be seen that the registration fits and threaded pump shaft of the prior art coupling assembly configuration are not utilized in the assembly of the present invention. As a result of the omission of these prior art elements, which are inherently difficult to machine accurately, and further as a result of the uniform maximum diameter of the components of the present invention, which diameter is small compared to the maximum diameter of the prior art coupling assembly, it will now be apparent to those familiar with the art to which the present invention pertains, that accurate machining to provide a maximum shaft runout at the stuffing box face of less than 0.002 inches would be far easier to attain and thus also possible to obtain at substantially reduced cost.

INDUSTRIAL APPLICABILITY

It will now be apparent that what has been disclosed herein is an improved coupling assembly for connecting the shaft of a vertical pump to the shaft of a pump driver for bearing both radial and axial thrust loads during pump operation, but which can be fabricated at substantially reduced costs and which substantially reduces the liklihood of pump shaft unbalance and the need for frequent and costly pump maintenance due to shaft runout-induced wobble and vibration. More specifically, what has been disclosed herein is a split spacer, rigid coupling assembly of reduced uniform maximum diameter which obviates the need for registration fits and threaded shafts of the prior art and which, as a result thereof, is more easily and inexpensively fabricated with accuracy required to achieve a shaft runout T.I.R. at the pump stuffing box face that is no greater than 0.002 inches. The result is a low cost, high performance coupling assembly of substantially improved industrial applicability.

Although a specific embodiment of the invention has been disclosed herein, it will now be apparent to those having ordinary skill in the art to which the invention pertains, that many other embodiments of the invention may be constructed. For example, in view of applicant's teaching herein disclosed, it will now be apparent that there may be variations in the manner in which the components of the invention may be interconnected as well as in the geometry of the assembled configuration, as long as the uniform and reduced maximum diameter as disclosed herein is substantially maintained. Accordingly, the invention is not to be limited except as defined by the appended claims.

I claim:
1. A coupling apparatus for rigidly securing the rotor shaft of a vertical pump relative to the position of the aligned rotor shaft of a pump driver, the apparatus comprising:
    a. a pair of cylindrical, rigid hubs of substantially constant circular cross section of equal diameter, one such hub having a concentrically located aperture suitable for insertion therethrough of said pump rotor shaft, and the other such hub having a concentrically located aperture suitable for insertion therethrough of said driver rotor shaft,
    b. means for radially and axially securing said hubs to the respective shafts at about the opposing ends thereof, and
    c. means for securing said hubs to each other in spaced parallel relation along a common cylindrical axis.
2. An apparatus for rigidly coupling two, spaced coaxial shafts, the apparatus comprising:
    a. a first cylindrical hub of uniform, substantially circular cross section, and having a concentrically located aperture along the hub axis for installing said first hub on one of said shafts at about the end thereof,
    b. a second cylindrical hub of uniform, substantially circular cross section, and having a concentrically located aperture along the hub axis for installing said second hub on the other of said shafts at about the end thereof,
    c. said first and second hubs having equal diameters,
    d. means for radially and axially securing said hubs to the respective shafts, and
    e. means for mechanically securing said hubs to each other in spaced parallel relation.
3. In a combination having a vertical pump and pump driver, wherein the vertical pump shaft is in coaxial spaced relation to the pump driver shaft whereby the pump shaft is rotated by the driver shaft when coupled thereto; an improved coupling apparatus for rigidly coupling the pump shaft to the driver shaft with reduced maximum pump shaft runout, the apparatus comprising:
    a. a first cylindrical hub of uniform, substantially circular cross section, and having concentrically located aperture along the hub axis through which said pump driver shaft is inserted,
    b. a second cylindrical hub of uniform, substantially circular cross section, and having a concentrically located aperture along the hub axis through which said vertical pump shaft is inserted,
    c. said first and second hubs having equal diameters,
    d. means for radially and axially securing said hubs to the respective shafts, and
    e. means for mechanically securing said first and second hubs to each other in spaced parallel relation.
4. The apparatus recited in claims 1, 2, or 3, wherein said securing means comprises:

a hollow cylindrical spacer having a maximum diameter equal to the diameter of said hubs and equal in length to the length of the space between said hubs.

5. The apparatus recited in claim 4, wherein said hollow cylindrical spacer comprises a pair of split spacer sections and means for securing said sections to each other.

6. The apparatus recited in claim 5, wherein said means for securing said spacer sections to one another are confined to be within said maximum diameter.

7. The apparatus recited in claims 1, 2 or 3, wherein said securing means comprises:
   at least one cylindrical shim having a maximum diameter equal to the diameter of said hubs and adapted for connection between said hubs.

8. The apparatus recited in claim 7, wherein said shim is split for installation between said hubs without removal of said hubs from said shafts.

9. The apparatus recited in claims 1, 2 or 3, wherein said means for radially and axially securing said hubs comprises rectangular keys adapted to be inserted in matching grooves partially in said shafts and partially in said hubs, and
   cylindrical rings adapted for insertion in matching horizontal grooves partially in said shafts and partially in said hubs.

10. The apparatus recited in claim 9, wherein said rings are split for easy installation within said horizontal grooves.

* * * * *

UNITED STATES PATENT AND TRADEMARK OFFICE
CERTIFICATE OF CORRECTION

PATENT NO. : 4,240,762
DATED : December 23, 1980
INVENTOR(S) : Valenteen Lobanoff It is certified that error appears in the above—identified patent and that said Letters Patent is hereby corrected as shown below:

Title of invention should be: --SELF-ALIGNING RIGID COUPLING ASSEMBLY--.

Signed and Sealed this

Seventh Day of April 1981

[SEAL]

Attest:

RENE D. TEGTMEYER

Attesting Officer     Acting Commissioner of Patents and Trademarks